(12) United States Patent  
Laine et al.

(10) Patent No.: US 9,417,442 B1  
(45) Date of Patent: Aug. 16, 2016

(54) APERTURE-FOLD IMAGING SYSTEM

(71) Applicant: The Charles Stark Draper Laboratory, Inc., Cambridge, MA (US)

(72) Inventors: Juha-Pekka J. Laine, Boston, MA (US); Francis J. Rogomentich, Wilmington, MA (US); Stephen P. Smith, Acton, MA (US); Robert Larsen, Somerville, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 113 days.

(21) Appl. No.: 14/308,276

(22) Filed: Jun. 18, 2014

Related U.S. Application Data

(60) Provisional application No. 61/842,634, filed on Jul. 3, 2013.

(51) Int. Cl.  
*G02B 5/08* (2006.01)  
*G02B 17/02* (2006.01)  
*G02B 17/08* (2006.01)

(52) U.S. Cl.  
CPC ............ *G02B 17/023* (2013.01); *G02B 17/086* (2013.01); *G02B 17/08* (2013.01)

(58) Field of Classification Search  
CPC .......... G02B 1/002; G02B 5/08; G02B 17/00; G02B 17/004; G02B 17/02; G02B 17/023; G02B 17/06; G02B 17/0605; G02B 17/061; G02B 17/0615; G02B 17/0621; G02B 17/0626; G02B 17/0631; G02B 17/0636; G02B 17/0642; G02B 17/0647; G02B 17/0652; G02B 17/0657; G02B 17/0663; G02B 17/08; G02B 17/0804; G02B 17/0808; G02B 17/0812; G02B 17/0816; G02B 17/082; G02B 17/0824; G02B 17/0828; G02B 17/0832; G02B 17/0836; G02B 17/084; G02B 17/0844; G02B 17/0848  
USPC ......... 359/566, 569, 570, 572, 838, 839, 850, 359/857, 858, 861, 864, 362, 363, 364, 365  
See application file for complete search history.

(56) References Cited

U.S. PATENT DOCUMENTS

2011/0194163 A1* 8/2011 Shimizu .................. G02B 5/32  
359/15

OTHER PUBLICATIONS

Samaan et al., "Predictive Centroiding for Single and Multiple FOVs Star Trackers," Paper AAS 02-103 presented at the AAS/AIAA Space Flight Mechanics Meeting in San Antonio, TX, 13 pages, Jan. 27-31, 2002.

(Continued)

*Primary Examiner* — Arnel C Lavarias  
(74) *Attorney, Agent, or Firm* — Sunstein Kann Murphy & Timbers LLP

(57) ABSTRACT

A folded optical system includes a powered optical element, at least one folding mirror and an aperture and defines an optical path through the optical system. The powered optical element, the at least one folding mirror and the aperture are configured to fold the optical path at the aperture, thereby providing a compact optical system. The optical system may include an optical block that totally internally reflects the optical signal at the aperture. Optionally or alternatively, discrete optical components may be used, such as an aperture made of a conventional material or a metamaterial, an off-axis parabolic mirror or lens and one or more folding mirrors. Some embodiments include a wavelength dispersive element, so as to implement a spectrometer.

24 Claims, 19 Drawing Sheets

(56) References Cited

OTHER PUBLICATIONS

Schwartz et al., "Total external reflection from metamaterials with ultralow refractive index," J. Opt. Soc. Am. B, vol. 20, No. 12, pp. 2448-2453, dated Dec. 2003.

Willhite, "An Analysis of ICBM Navigation Using Optical Observations of Existing Space Objects," MS Thesis, MIT, 123 pages, dated Jun. 2004.

Schwartz et al., "Waveguiding in air by total external reflection from ultralow index metamaterials," Applied Physics Letters, vol. 85, No. 1, pp. 1-3, dated Jul. 5, 2004.

Schwartz et al. "A New Path—Ultralow-index metamaterials present new possibilities for controlling light propagation," SPIE's oemagazine, pp. 30-32, dated Jan. 2005.

Stamenov et al., "Optimization of two-glass monocentric lenses for compact panoramic imagers: general aberration analysis and specific designs," Applied Optics, vol. 51, No. 31, pp. 7648-7661, dated Nov. 1, 2012.

Diprose, "New Technology: A Camera Without a Lens—Metamaterial Aperture," F Stop Lounge.com, 5 pages, dated Jan. 19, 2013.

* cited by examiner

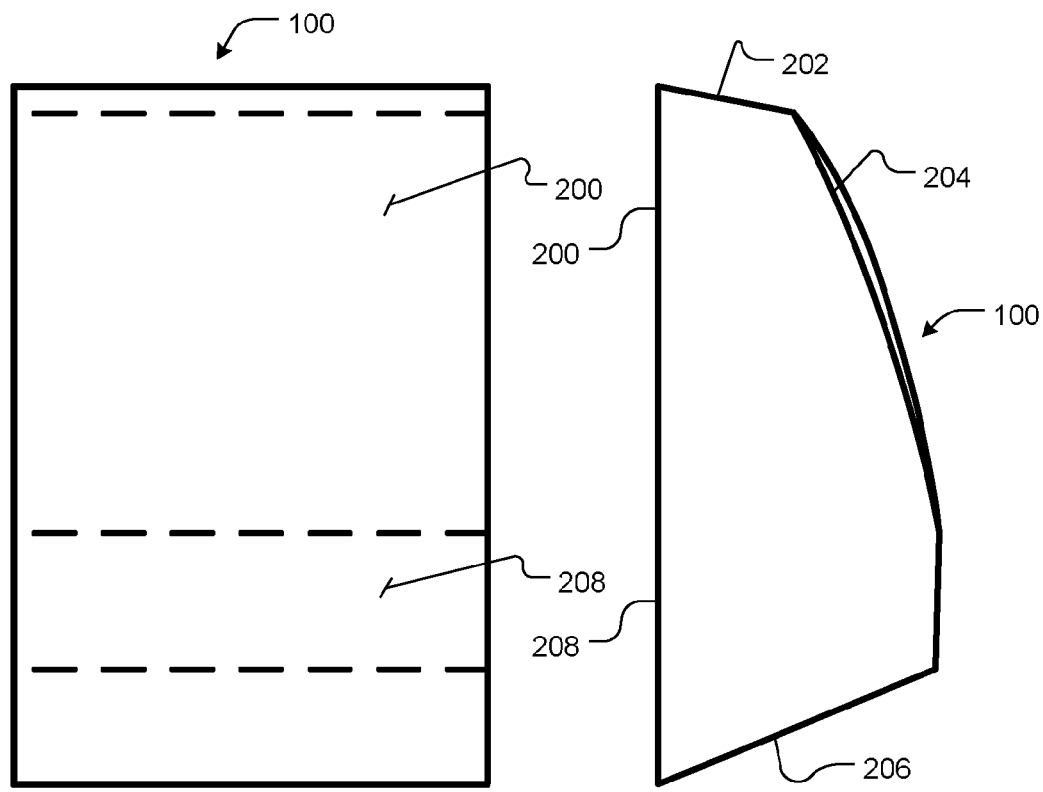
*Left Side View*
FIG. 3
*Top View*
FIG. 2
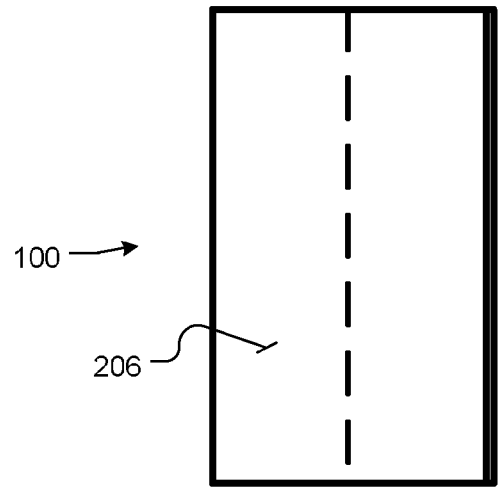
*Front View*
FIG. 4

*Back View*

*Top View*

APERTURE-FOLD IMAGING SYSTEM

CROSS REFERENCE TO RELATED APPLICATIONS

This application claims the benefit of U.S. Provisional Patent Application No. 61/842,634, filed Jul. 3, 2013, titled "Aperture-Fold Imaging System," the entire contents of which are hereby incorporated by reference herein, for all purposes.

TECHNICAL FIELD

The present invention relates to folded optical systems and, more particularly, to a folded optical system in which at least one fold occurs at an aperture of the system.

BACKGROUND ART

Optical systems, such as telescopes, often require optical paths of specific lengths, such as focal lengths of optical elements. To reduce physical size of an optical system, an optical path may be folded one or more times by one or more reflecting elements, typically mirrors. Some folded optical systems, such as early Newtonian telescopes, dispose one or more of the reflecting elements within an optical path, thereby obstructing a portion of the optical path. Judicial placement of reflecting optical elements can, however, yield unobstructed folded optical systems.

Traditional unobstructed multi-reflection telescopes utilize three or more mirrors to correct and maneuver a ray bundle between an aperture and an image sensor, eyepiece or other output device. However, such telescopes are relatively physically large. More compact telescopes are desirable, such as when they are used on artificial satellites or other space vehicles.

SUMMARY OF EMBODIMENTS

An embodiment of the present invention provides an optical system. The optical system includes an aperture configured to admit an optical signal along an optical path. The optical system also includes a powered optical element disposed along the optical path. The powered optical element is configured to receive the optical signal along the optical path and to forward the optical signal along the optical path. The optical system also includes a first mirror disposed along the optical path. The first mirror is disposed downstream of the powered optical element. The first mirror is configured to fold the optical path at the first mirror. The aperture, the powered optical element and the first mirror are configured to fold the optical path at the aperture.

The optical system may include a second mirror disposed along the optical path. The second mirror may be disposed downstream of the first mirror. The second mirror may be configured to fold the optical path at the second mirror. The aperture, the powered optical element, the first mirror and the second mirror may be configured to fold the optical path at the aperture.

The optical system may include an optical block defining the aperture. The aperture may be configured to admit light from an optical medium into the optical block. The optical medium may be immediately adjacent the aperture. The optical block may have an index of refraction greater than an index of refraction of the optical medium. The optical block may be configured to internally reflect the optical signal within the optical block at the aperture, so as to fold the optical path at the aperture.

The optical block may be configured to totally internally reflect the optical signal within the optical block at the aperture, so as to fold the optical path at the aperture.

The optical block may at least partially define the powered optical element and the first mirror. The powered optical element may include an off-axis parabolic mirror. The powered optical element may further include a diffraction grating.

The powered optical element and/or the first mirror may be coated with a metamaterial and/or patterned with sub-wavelength sized microstructures configured to cause the powered optical element or the first mirror, as the case may be, to reflect the optical signal at a predetermined wavelength. That is, the powered optical element may be coated with a metamaterial configured to reflect the optical signal at a predetermined wavelength. The first mirror may be coated with a metamaterial configured to reflect the optical signal at a predetermined wavelength. The powered optical element may be patterned with sub-wavelength sized microstructures configured to reflect the optical signal at a predetermined wavelength. The first mirror may be patterned with sub-wavelength sized microstructures configured to reflect the optical signal at a predetermined wavelength.

The optical block may include a wavelength-dispersive material.

The optical system may further include a second mirror disposed along the optical path. The second mirror may be disposed downstream of the first mirror. The second mirror may be configured to fold the optical path at the second mirror. The aperture, the powered optical element, the first mirror and the second mirror may be configured to fold the optical path at the aperture.

The optical block may at least partially define the second mirror.

The optical system may further include a wavelength dispersive element disposed along the optical path.

The powered optical element may include a lens.

The first mirror may be configured to at least partially correct an optical aberration, of the optical signal, caused by the powered optical element.

The aperture may be configured, at least at wavelengths within a predetermined range, to transmit the optical signal along the optical path through the aperture and then to externally reflect the optical signal from a surface of the aperture, so as to fold the optical path at the aperture.

The aperture, the powered optical element and the first mirror may be configured to fold the optical path at the aperture at a Brewster angle of the optical signal.

The aperture, the powered optical element and the first mirror may be configured, and the aperture may include a material having an index of refraction, so as to totally externally reflect the optical signal at the aperture.

The aperture may include a material having an index of refraction less than 1.

The powered optical element may include an off-axis parabolic mirror. The powered optical element may further include a diffraction grating. The powered optical element may include a lens.

The optical system may further include a wavelength dispersive element disposed along the optical path.

The optical system may further include a second mirror disposed along the optical path. The second mirror may be disposed downstream of the first mirror. The second mirror may be configured to fold the optical path at the second mirror. The aperture, the powered optical element, the first mirror and the second mirror may be configured to fold the optical path at the aperture.

Another embodiment of the present invention provides an optical system. The optical system includes an optically transparent block having an index of refraction and defining an aperture. The aperture may be configured to admit light from an optical medium into the optically transparent block. The optical medium may be disposed immediately adjacent the aperture. The optical medium may have an index of refraction less than the index of refraction of the optically transparent block. The optical system also includes an image plane and a first mirror. The optically transparent block and the first mirror may be configured to define an optical path within the optically transparent block, from the aperture to the image plane. The optical path includes at least one reflection off the aperture.

The aperture may be optically flat.

The at least one reflection off the aperture may be a total internal reflection within the optically transparent block.

The first mirror may include a parabolic mirror. The first mirror may include an off-axis parabolic mirror.

The optical system may further include a second mirror. The optically transparent block, the first mirror and the second mirror may be configured to define the optical path. The optical path includes at least two reflections off the aperture.

BRIEF DESCRIPTION OF THE DRAWINGS

The invention will be more fully understood by referring to the following Detailed Description of Specific Embodiments in conjunction with the Drawings, of which:

FIGS. 2, 3 and 4 are respective top, left side and front view schematic diagrams of the optical block of FIG. 1.

DETAILED DESCRIPTION OF SPECIFIC EMBODIMENTS

In accordance with embodiments of the present invention, methods and apparatus are disclosed for folding an optical path at an aperture of an optical system. Such an arrangement can lead to compact optical systems. Some embodiments include solid optical blocks and employ total internal reflection at the aperture. Other embodiments include apertures made of conventional materials and are configured so as to fold the optical path at the aperture at the Brewster angle. Yet other embodiments include apertures made of metamaterials having indexes of refraction less than 1 and are configured to fold the optical signal at the aperture by total external reflection. Other embodiments include apertures that contain sub-wavelength-sized patterned structures (some being grating-like) that pass optical signals through at roughly perpendicular angles and redirect optical signals at lower angles.

Optical Block Embodiments

By way of background and definition, "total internal reflection" is a phenomenon that occurs when a propagating wave strikes a medium boundary surface at an angle larger than a particular critical angle, with respect to a normal to the surface. If the refractive index is lower on the other side of the boundary, and the incident angle is greater than the critical angle, the wave cannot pass through the boundary and the wave is entirely reflected. The critical angle is an angle of incidence above which the total internal reflectance occurs. Generally, when a wave crosses a boundary between materials with different refractive indices, the wave is partially refracted at the boundary surface and partially reflected. However, if the angle of incidence is greater (i.e., if the direction of propagation or ray is closer to being parallel to the boundary) than the critical angle (i.e., an angle of incidence at which light is refracted such that it travels along the boundary), the wave does not cross the boundary and instead the wave is totally reflected back internally. In conventional materials, this occurs only where the wave travels from a medium with a higher refractive index to a medium with a lower refractive index. For example, it occurs when light passes from glass to air, but not when light passes from air to glass.

Figure 1:
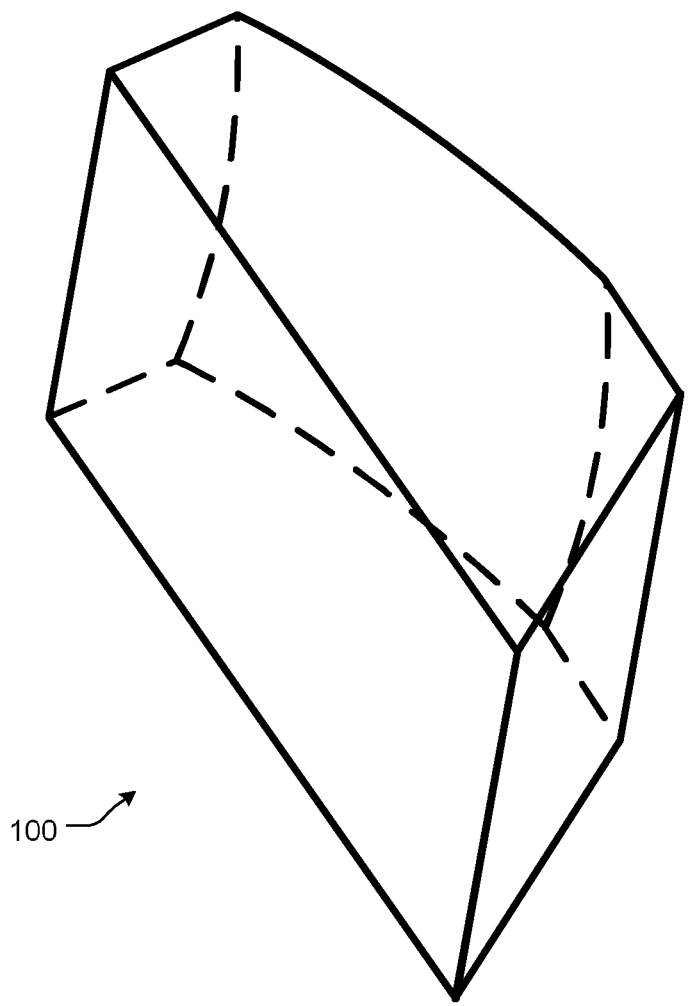
FIG. 1 is a perspective schematic diagram of an optical block, according to an embodiment of the present invention.

FIG. 1 is a perspective schematic diagram of an optical block 100, according to an embodiment of the present invention. The optical block 100 may be fabricated of material that is optically transparent at wavelengths of interest. "Optically transparent" means the material transmits an optical signal at a wavelength of interest through the material, such that after passing through the material, the optical signal retains a sufficient fraction of its initial amplitude for a desired application. For example, for visible wavelengths (about 390 nm to about 700 nm), any visible-light transparent material, such as an optical polymer or glass (e.g., BK-7, borosilicate, etc.), may be used. FIGS. 2, 3 and 4 are respective top, left side and front view schematic diagrams of the optical block 100. As best seen in FIG. 2, the optical block 100 defines a flat input surface 200 (also referred to herein as an aperture), a flat output surface 202, an off-axis parabolic surface 204, a flat surface 206 and another flat surface 208, which may, but in some embodiments need not, be coplanar with the aperture 200. The optical block 100 may be fabricated using conventional optical fabrication techniques, such as casting, grinding and polishing.

Figure 5:
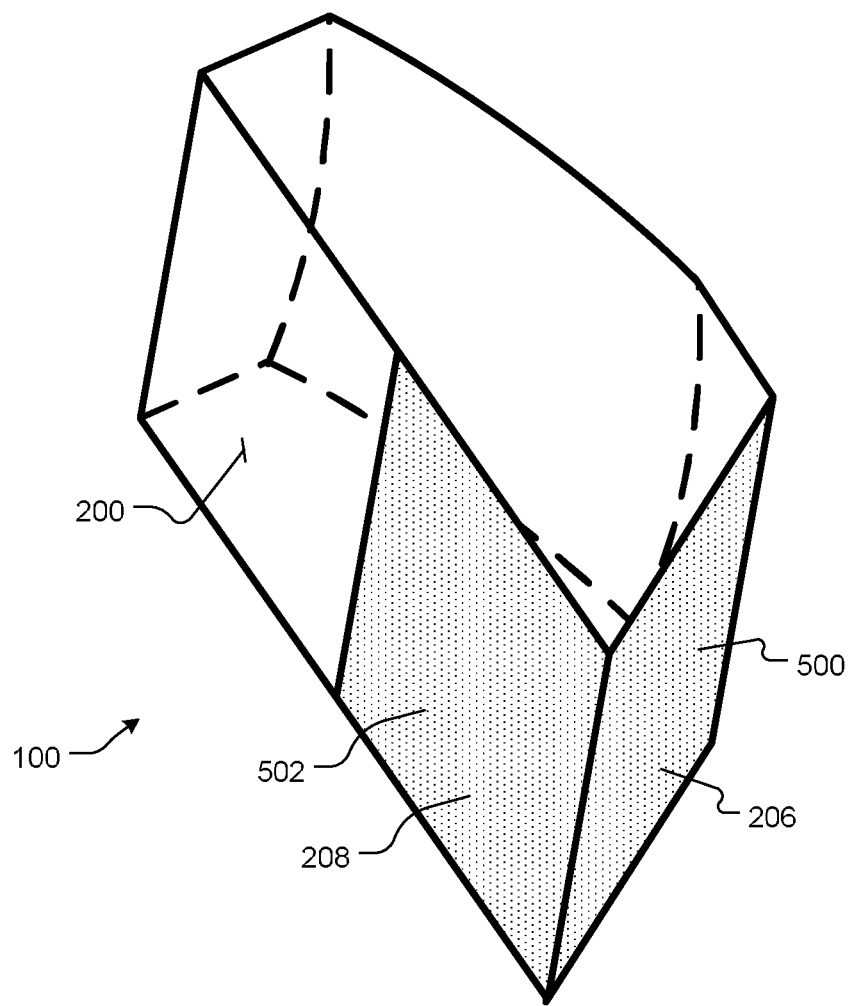
FIG. 5 is a perspective schematic diagram of the optical block of FIGS. 1-4, showing material on two flat surfaces of the optical block to make these surfaces internally reflective, according to an embodiment of the present invention.
Figure 6:
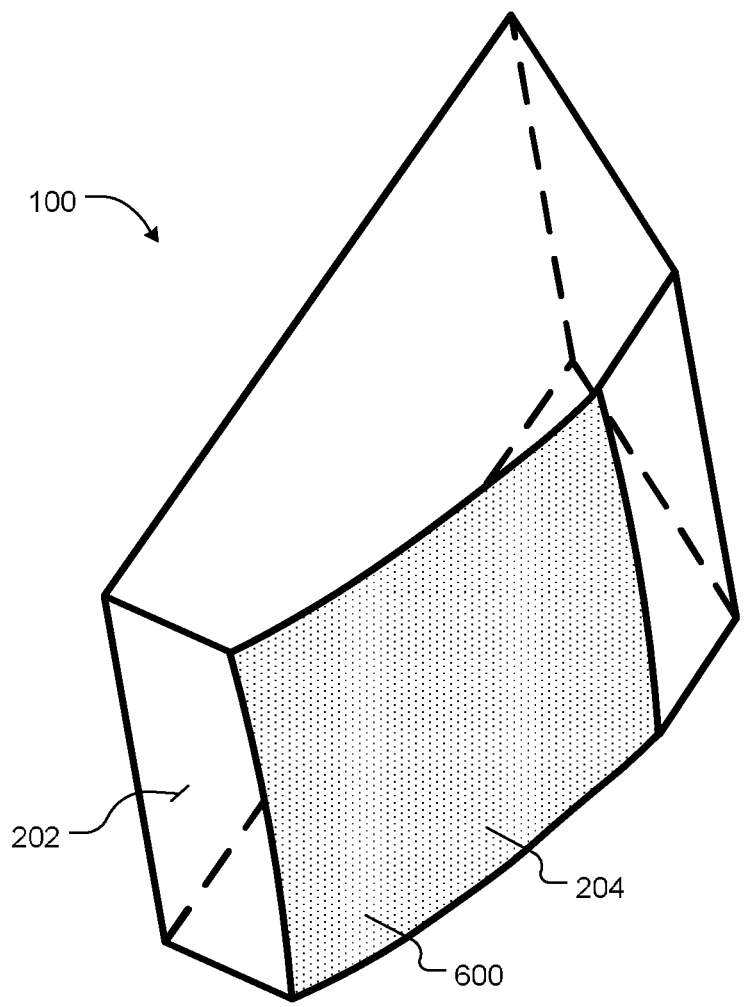
FIG. 6 is a perspective schematic diagram of the optical block of FIGS. 1-5, rotated 180 degrees to show the optical block from another view, including material on an additional surface of the optical block to make this surface internally reflective, according to an embodiment of the present invention.

As shown by stippling in FIG. 5, the flat surfaces 206 and 208 are coated with material 500 and 502, respectively, to make the surfaces 206 and 208 internally reflective, i.e., to make them reflective interior to the optical block 100. In some embodiments, the flat surfaces 206 and 208 are coated, e.g., silvered, for reflection. In other embodiments, the flat surfaces 206 and 208 may be covered with metamaterial or patterned with sub-wavelength sized microstructures to redirect impinging optical signals in appropriate directions, ex. optical signal rays C and D (described below, with reference to FIG. 7). Similarly, as shown in FIG. 6, the off-axis parabolic surface 204 is also coated with material 600 to make it reflective interior to the optical block 100. In some embodiments, the off-axis parabolic surface 204 may be covered with metamaterial or patterned with sub-wavelength-sized microstructures to redirect impinging optical signals in appropriate directions, ex, optical ray B (described below, with reference to FIG. 7).

Figure 7:
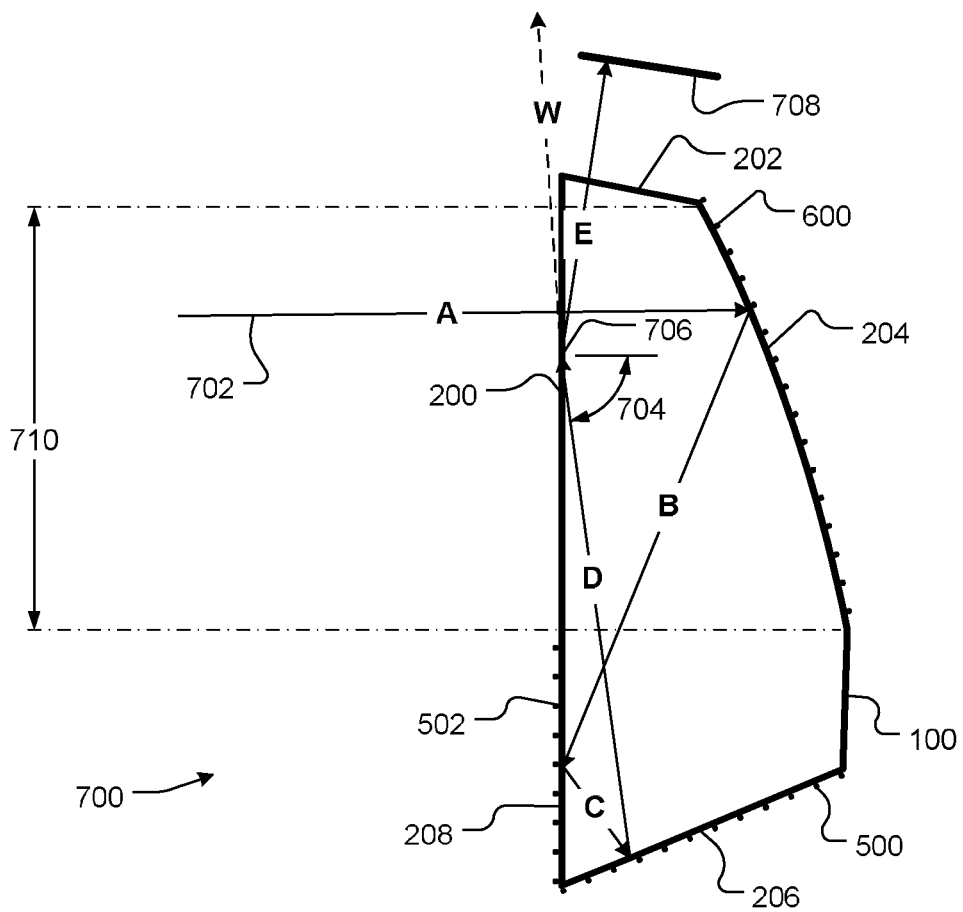
FIG. 7 is a top view schematic diagram of an optical system that includes the optical block of FIGS. 1-6, showing an optical path extending through the optical block, according to an embodiment of the present invention.

Like FIG. 2, FIG. 7 is a top view schematic diagram of an optical system 700 that includes the optical block 100, except FIG. 7 shows the material 500, 502 and 600 on the two flat surfaces 206 and 208 and on the off-axis parabolic surface 204, respectively, that make these surfaces internally reflective. The flat input surface 200 defines an aperture, through which the optical block 100 may receive an optical signal 702. The input surface 200 should be at least approximately perpendicular to the optical signal 702. The optical block 100 is configured such that the optical signal 702 impinges on the off-axis parabolic surface 204, as indicated by arrow A. The off-axis parabolic surface 204 reflects the optical signal, as indicated by arrow B. The reflected optical signal ray B impinges on reflective surface 208, and is there reflected to reflective surface 206, as indicated by arrow C.

The reflective surface 206 reflects the optical signal, as indicated by arrow D, toward the aperture 200. The aperture 200 is transparent. However, preferably, the angle 704, relative to a normal to the aperture 200, at which the ray D portion of the optical signal impinges on the aperture 200 is large enough that the optical signal D is totally internally reflected, at 706, within the optical block 100. The totally internally reflected portion of the optical signal, indicated by arrow E, exits the optical block 100 via the output surface 202 and impinges on an image sensor 708 or passes to another output device or output port (not shown). The output surface 202 should be perpendicular, or close to perpendicular, to ray E. If some signal loss is acceptable, the angle 704 need not be large enough to cause total internal reflection. In such cases, some portion of the optical signal ray D is refracted and exits the optical block 100, as indicated by arrow W.

Unlike surfaces 204, 206 and 208, the aperture 200 is not coated with a material that would make the aperture 200 opaque to the input optical signal 702. The aperture 200 may, however, have an optical coating of one or more thin layers applied to it, such as an anti-reflective coating as is well known in the art, to improve or preserve transparency of the aperture 200 to ray A.

The aperture 200 may be sized according to the size of the off-axis parabolic surface 204, as indicated by dash-dotted lines 710, so any ray parallel to ray A that would impinge on the off-axis parabolic surface 204 is admitted by the aperture 200. This typically requires the material 502 that makes surface 208 reflective not to extend over the aperture 200, so as not to obscure any portion of the aperture 200. However, if desired, the optically transparent extent of the aperture 200 may be made less than the size of the off-axis parabolic surface 204, for example to limit size, shape and/or position of a bundle of rays admitted by the aperture 200 or to limit the portion of the off-axis parabolic surface 204 on which the ray bundle impinges.

In use, the optical block 100, or at least the aperture 200, is immediately adjacent an optical medium, such as air, a vacuum or another medium. "Immediately adjacent" means the surface of the aperture 200, or if the aperture 200 has an optical coating, an outer surface of the optical coating, is in contact with the other medium. The material of the optical block 100 has an index of refraction greater than the index of refraction of the immediately adjacent optical medium, and the optical block 100, in particular the position and orientation of the aperture 200, the off-axis parabolic surface 204 and the flat surfaces 208 and 206, is configured such that the optical path A, B, C, D and E is folded at 706 by the aperture 200. As noted, the angle 704 of incidence of ray D preferably causes the ray D to be totally internally reflected within the optical block 100. It should be noted that in use, such as in a vacuum of space, the optical medium immediately adjacent the aperture 100 may be different than when the optical block 100 is manufactured, such as in an air atmosphere of earth.

Figure 8:
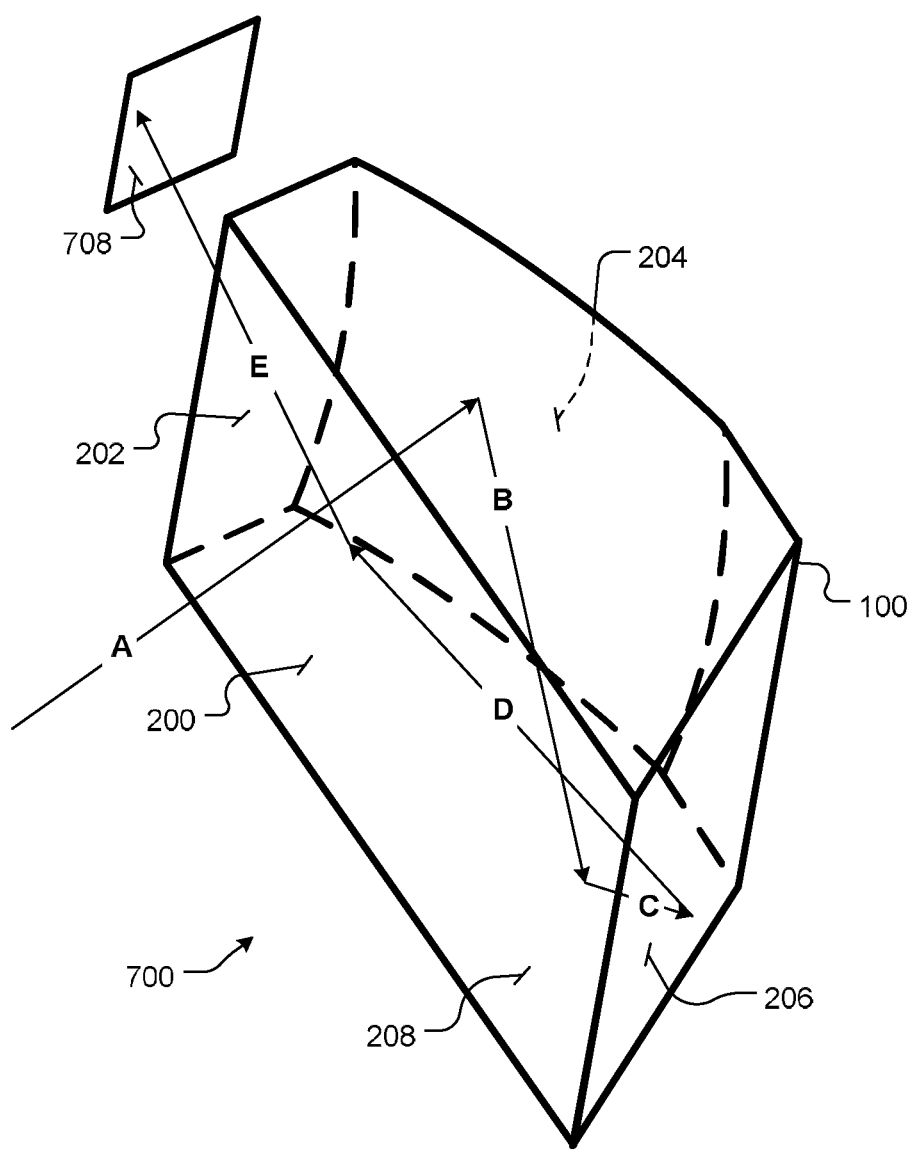
FIG. 8 is a perspective schematic diagram of the optical block of FIGS. 1-7, similar to the view shown in FIG. 5, but here showing the optical path extending through the optical block.

The off-axis parabolic surface 204 and its material 600 form a powered optical element, in this case a mirror, having a focal length equal to the sum of the lengths of arrows B, C, D and E. A "powered optical element" is an optical element with a magnification other than 1 or −1. Thus, the optical path is folded by each of the reflecting surfaces 204, 208 and 206 and by the aperture 200. FIG. 8 is a perspective schematic diagram of the optical block 100 showing the optical path rays A, B, C, D and E. In the interest of clarity, the materials 500, 600 and 602 used to make the surfaces 206, 208 and 204 reflective are not shown in FIG. 8.

Although reflecting surfaces 206 and 208 are flat in the optical system 700 described above, with respect to FIGS. 1-8, one or both of these reflecting surfaces 206 and 208 may be curved, for example, so as to at least partially correct one or more optical aberrations, such as a spherical aberration, coma or astigmatism, of the optical signal ray B caused by the off-axis parabolic surface 204.

The optical block 100, with the materials 500, 600 and 602, forms an optical system 700 that may be advantageously used as, or as part of, a telescope, a star tracker, a monocular, one half of a binocular or another optical device. Folding the optical path at the aperture 200 (FIGS. 7 and 8) yields a compact optical system. For example, folding the optical path at the aperture 200 can yield a telescope smaller than a comparable conventional three-mirror anastigmat ("TMA").

Discrete Optical Components Embodiments

Figure 9:
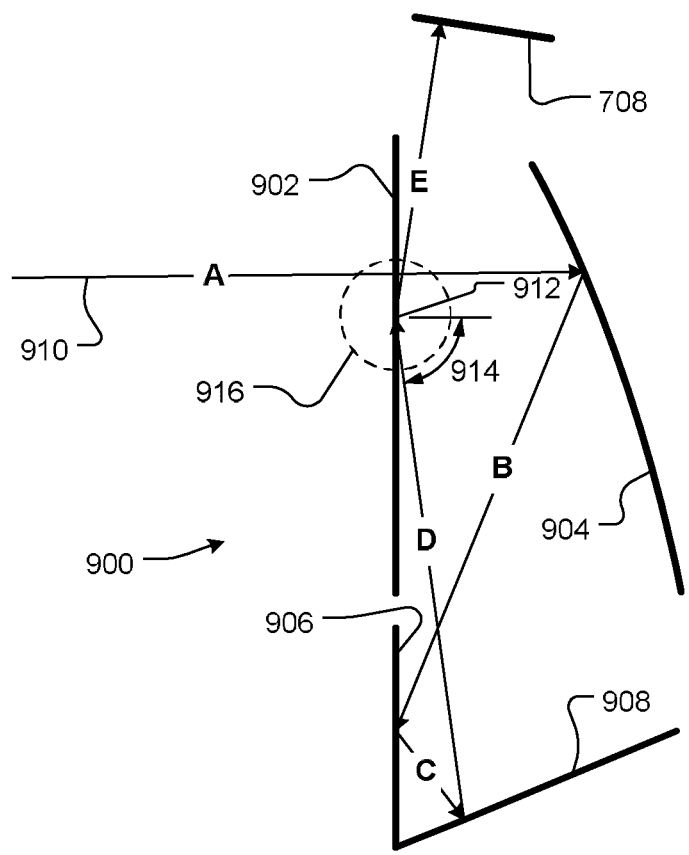
FIG. 9 is a top view schematic diagram of an optical system that includes discrete optical elements, according to another embodiment of the present invention.

FIG. 9 is a top view schematic diagram of an optical system 900 according to some other embodiments of the present invention. Functionally, the optical system 900 is similar to the optical block 100 of FIG. 1. However, the optical system 900 includes several discrete optical components in place of the optical block 100 of FIG. 1. The optical system 900 includes an aperture 902, an off-axis parabolic mirror 904 and two flat mirrors 906 and 908. The off-axis parabolic mirror 904 and the two flat mirrors 906 and 908 may be conventional mirrors, ex., glass mirrors, each with material (such as silver) applied to one surface thereof to make the mirror reflective. The aperture 902 is made of a material that is transparent at wavelengths of interest to optical signals approximately perpendicular to the aperture 902, such as an input optical signal 910 (ray A). The material is selected or configured to totally, nearly totally, substantially or partially externally reflect optical signals at wavelengths of interest that impinge upon a surface of the material (in some cases at particular angles or at angles greater or less than a critical angle). Components of the optical system 900 are configured so that ray D impinges on the surface of the aperture 902 at a desired angle 914. Thus, the optical signal ray D, which impinges on the aperture 902 at 912 at angle 914, is totally, nearly totally, substantially or partially externally reflected by the aperture 902, as indicated by arrow E. In this embodiment, the ray D is totally, nearly totally, substantially or partially externally reflected by the surface of the aperture 902 facing the off-axis parabolic mirror 904.

If the input signal 910 is unpolarized, and a ray E that is polarized would be sufficient to meet the needs of an application of the optical system 900, the aperture 902 may be made of a conventional material, such as borosilicate or another appropriate glass. In this embodiment, the aperture 902, the off-axis parabolic mirror 904 and the two flat mirrors 906 and 908 are arranged such that the angle 914 is, at least approximately, equal to the Brewster angle for wavelength(s) of interest and the combination of the material of the aperture 902 and the optical medium immediately adjacent the surface of the aperture 902 at 912. For example, for visible light, glass (with an index of refraction of about 1.5) and air, the Brewster angle is about 56°.

Figure 10:
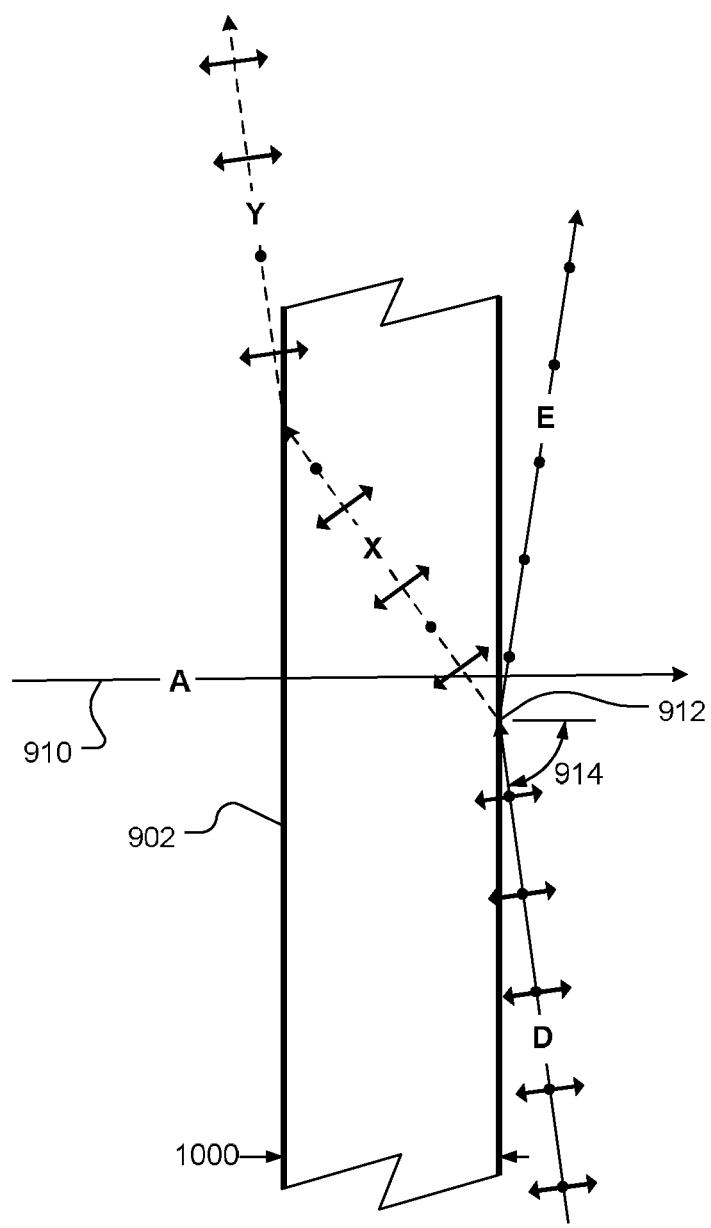
FIG. 10 is an enlarged view of a portion of the optical system of FIG. 9.

FIG. 10 is an enlarged view of a portion of FIG. 9 enclosed by dashed circle 916. Thickness of the aperture 902 is indicated at 1000. As used herein, "externally reflected" means waves of an optical signal are reflected (technically, absorbed and then re-radiated) at the first surface of a material they encounter. As shown in FIG. 10, ray E is externally reflected by the surface of the aperture 902 facing the off-axis mirror 904 (not shown in FIG. 10). If the ray D is unpolarized, as indicated by two-headed arrows in the plane of the figure and dots representing two-headed arrows perpendicular to the plane of the figure, the reflected ray E is polarized, as indicated by dots. The remainder of the ray D is refracted into the material of the aperture 902, as indicated by arrow X. This ray X is slightly polarized. The ray X is refracted when it reaches the other surface of the aperture 902, as indicated by arrow Y.

Some other embodiments of the optical system of FIG. 9 do not rely on the Brewster angle. In some such embodiments, the aperture 902 is made of a material, such as a metamaterial, having an index of refraction less than 1.

By way of background and definition, "metamaterials," an extension of the concept of artificial dielectrics, typically consist of periodic structures of a guest material embedded in a host material. While homogeneous dielectrics derive their optical properties from the sub-nanometer-scale structure of their atoms, metamaterials derive their properties from the sub-wavelength-scale structure of their component (guest) materials. When the wavelength of a field interacting with the structure is much longer than the feature sizes and unit cell, the metamaterial can be treated as a homogeneous dielectric with macroscopic parameters, such as effective refractive index $n_{eff}$. A proper choice of component materials and geometries can yield metamaterials with novel optical properties, which allow the metamaterials to control light in unconventional ways with potential applications in photonic integration. [1]

Figure 11:
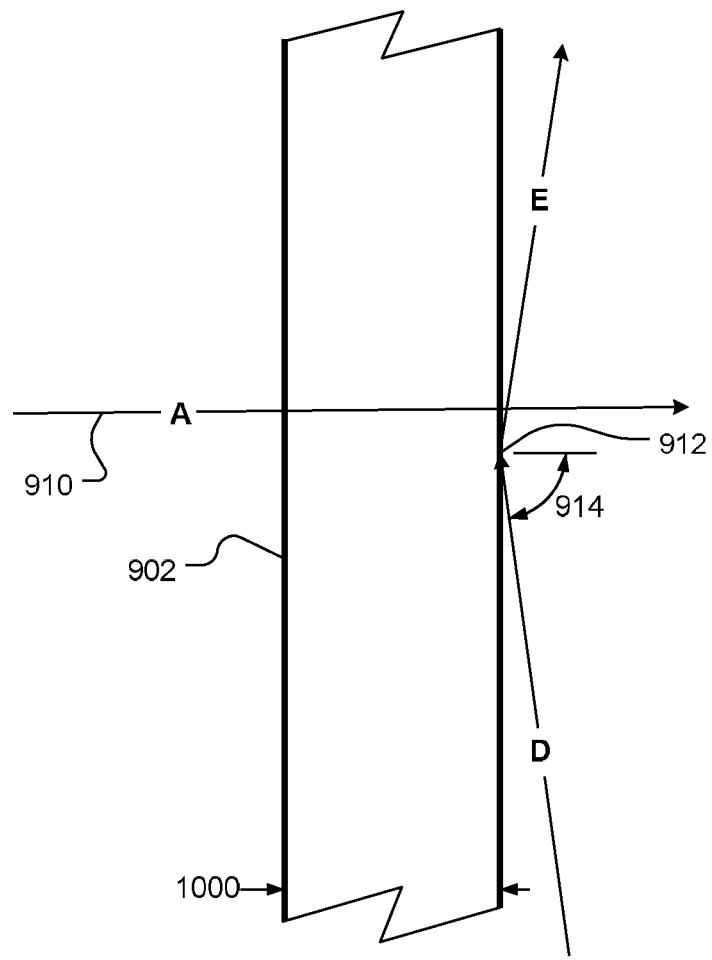
FIG. 11 is an enlarged view of a portion of the optical system of FIG. 9, according to another embodiment of the present invention.

Returning to FIG. 9, another embodiment of the present invention includes an aperture 902 that is sufficiently transparent at wavelengths of interest to an approximately perpendicular input optical signal 910 and that has an index of refraction less than 1 at these wavelengths. Such a metamaterial has been described in the scientific literature. [1][2][3] In this embodiment, the aperture 902, the off-axis parabolic mirror 904 and the two flat mirrors 906 and 908 are arranged so the optical signal ray D impinges on the surface of the aperture 902 at an angle 914 greater than the critical angle for wavelengths of interest. Consequently, as shown in FIG. 11, ray D is totally externally reflected at 912 by aperture 902. The reflected ray E impinges on the image sensor 708 (FIG. 9) or passes to another output device or output port (not shown).

Other Powered Optical Elements

Figure 12:
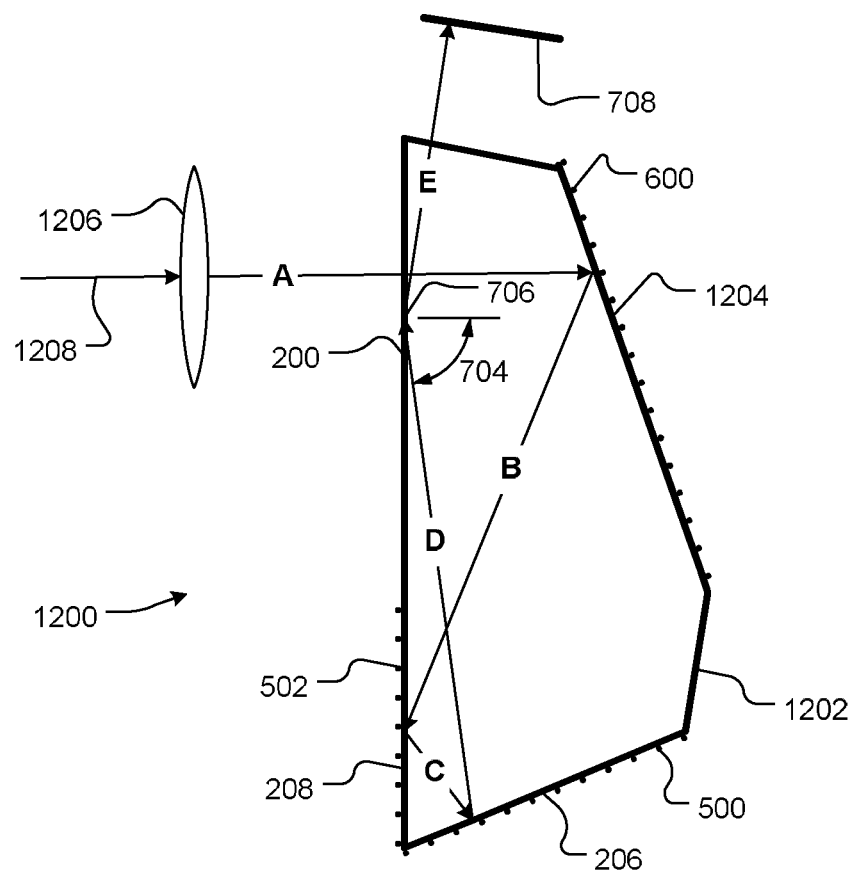
FIG. 12 is a top view schematic diagram of an optical system that includes an optical block and an optical path extending through the optical block, according to another embodiment of the present invention.

Although the optical systems described above include off-axis parabolic mirrors 204 or 904, other types of powered optical elements may be used, including lenses or shaped mirrors. FIG. 12 is a top view schematic diagram of such an optical system 1200, according to an embodiment of the present invention. The optical system 1200 includes an optical block 1202, similar to the optical block 100 discussed above, with respect to FIGS. 1-8, except the optical block 1202 defines a flat surface 1204, instead of an off-axis parabolic surface. The flat surface 1204 is made reflective by material 600, as in the optical block 100. The optical system 1200 includes a lens 1206 (or another powered optical element, not shown) disposed along an optical path 1208, upstream of the aperture 200. The focal length of the lens 1206 is equal to the sum of the lengths of arrows A, B, C, D and E.

Figure 13:
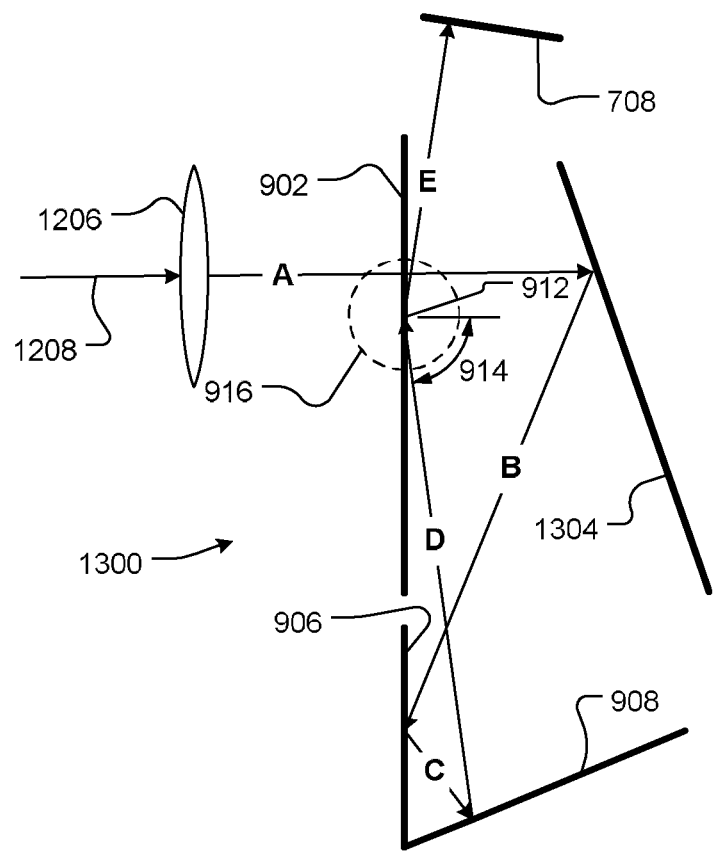
FIG. 13 is a top view schematic diagram of an optical system that includes discrete optical elements, according to yet another embodiment of the present invention.

Other types of powered optical elements may be used in discrete optical components embodiments, as exemplified by an optical system 1300 shown schematically in FIG. 13. This embodiment, like the embodiment of FIG. 12, includes a flat mirror 1304 and a lens 1206 disposed upstream of the aperture 902. Alternatively, the lens 1206 or other powered optical element may be disposed along the optical path 1208 between the aperture 902 and the flat mirror 1304.

Other optical systems (not shown) may include multiple powered optical elements (for example, mirrors and/or lenses) along the optical path 1208. These powered optical elements may all be disposed upstream of the aperture 902, all downstream of the aperture 902 or a combination of some upstream and others downstream of the aperture 902. One or more of the powered optical elements may at least partially correct one or more optical aberrations, such as a spherical aberration, coma or astigmatism, caused by one or more of the other powered optical elements. Optionally or additionally, one or more of the flat mirrors 206 and 208 or 906 and 908 may be curved, so as to at least partially correct one or more optical aberrations caused by one or more of the powered optical elements.

Number and Location of Folds and Folding Mirrors

Figure 14:
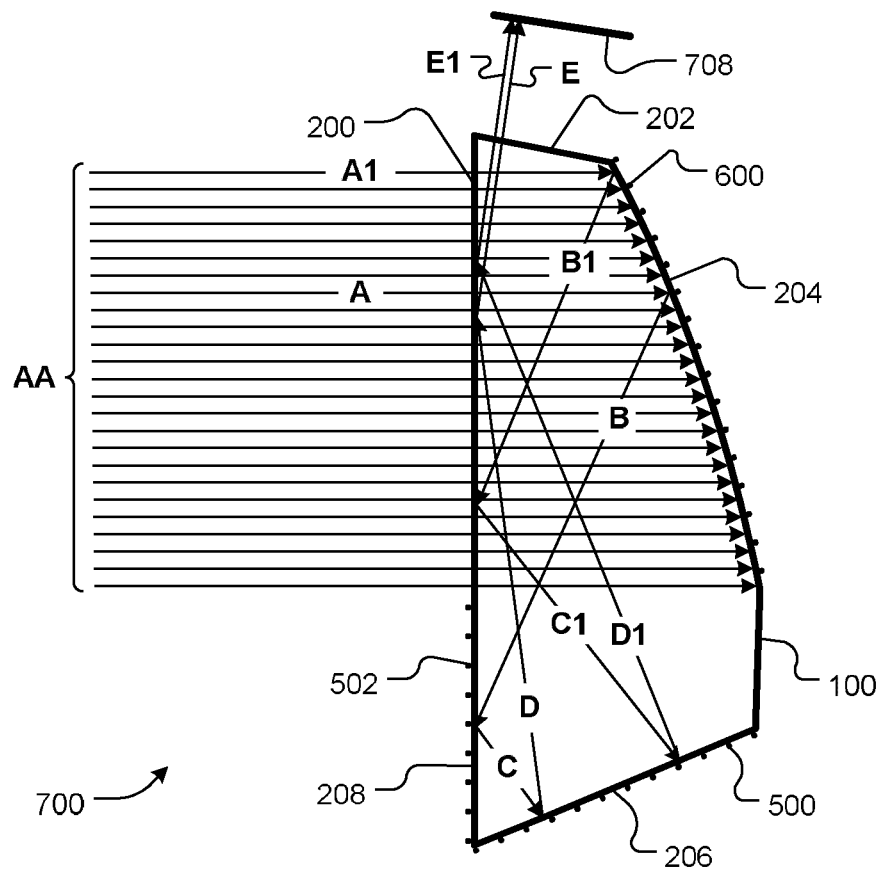
FIG. 14 is a top view schematic diagram of the optical block of FIGS. 1-8 illustrating rays transmitted through the optical block, according to embodiments of the present invention.

In FIG. 7, ray B is shown as impinging on the flat surface 208. However, as shown schematically in FIG. 14, some rays (such as ray A1) of a ray bundle AA entering the aperture 200 may be reflected, as exemplified by ray B1, by the off-axis parabolic surface 204 onto the aperture 200, rather than onto surface 208, and other rays (such as ray B) may be reflected by the off-axis parabolic surface 204 onto the surface 208. The optical bock 100 may be configured such that rays reflected by the off-axis parabolic surface 204 onto the aperture 200 impinge on the aperture 200 at angles that cause these rays to be totally internally reflected by the aperture 200. If a ray bundle of a given fold of the optical signal spans the aperture 200 and the surface 208, the aperture 200 and the surface 208 should be co-planar, and the reflectivity of surface 208 should be at least approximately equal to the total internal reflectivity of the aperture 200. Rays B1 and D1 exemplify portions of the optical signal that are totally internally reflected more than once by the aperture 200, as occurs in some embodiments.

Figure 15:
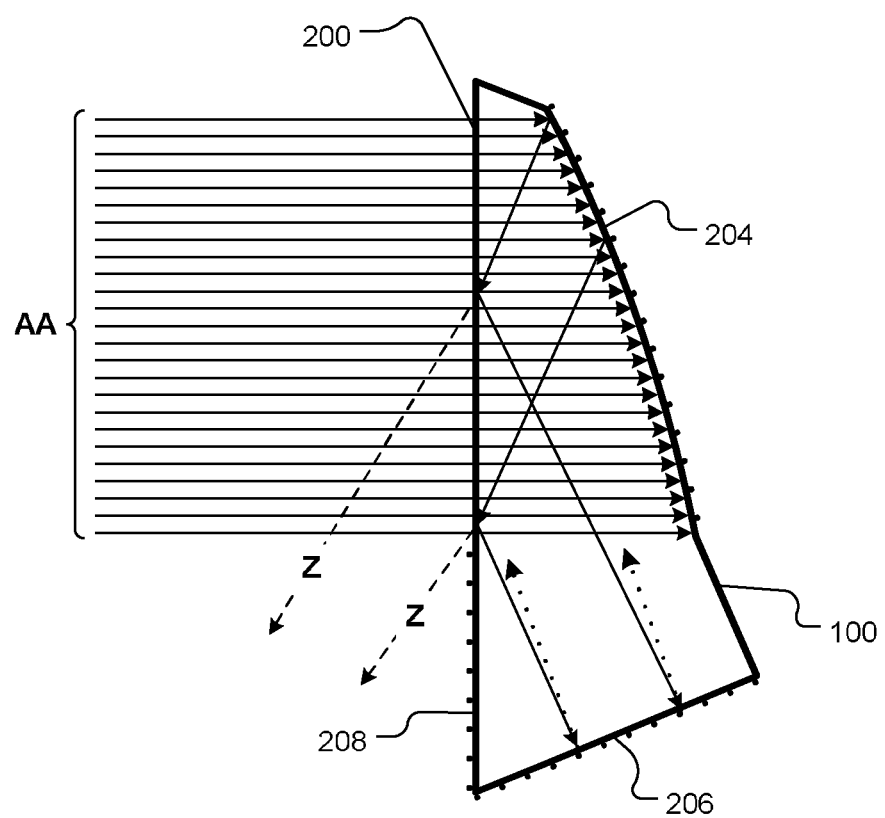
FIG. 15 is a top view schematic diagram of an optical block, similar to the optical block of FIGS. 1-8, except with an off-axis parabolic surface located closer to an aperture thereof, to demonstrate an advantage of folding the optical path at the aperture, according to embodiments of the present invention.

Bringing the off-axis parabolic surface 204 closer to the aperture 200, as schematically illustrated in FIG. 15, demonstrates an advantage provided by folding the optical path at the aperture 200. If the optical path were not folded at the aperture 200, much of the optical signal would be lost by refraction out of the optical block 100, as indicated by dashed lines Z. Size, mass or volume constraints may require placing the off-axis parabolic surface 204 close to the aperture 200, or it may simply be desirable to do so. In any case, folding the optical path at the aperture 200 makes a compact optical system possible.

Figure 16:
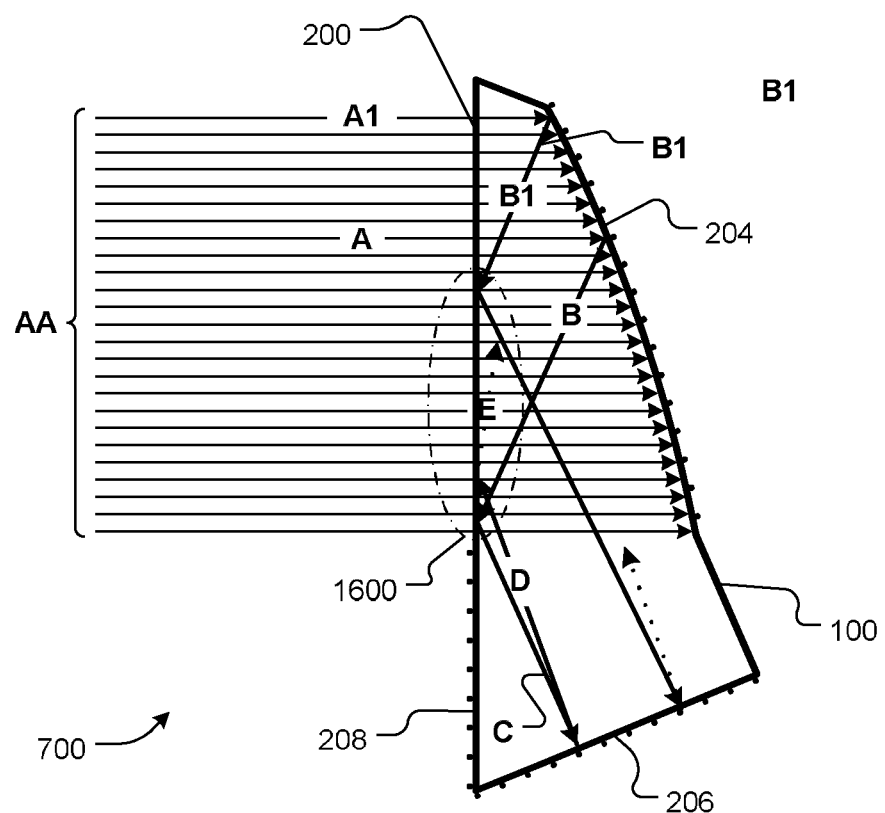
FIG. 16 is a top view schematic diagram of the optical block of FIG. 15 illustrating two or more aperture fold zones, according to embodiments of the present invention.

It should be noted that, in some cases, two or more aperture fold zones may overlap, as schematically exemplified in FIG. 16. Some rays (B1 to B) reflected by the off-axis parabolic surface 204 are folded at the aperture 200, creating a first aperture fold zone, as indicated by a dash-dotted ellipse 1600. Some rays (such as ray D) reflected by the flat surface 206 are also folded at the aperture 200 within the first aperture fold zone.

Although the optical systems described above, such as with respect to FIGS. 7 and 9, include two flat mirrors 206 and 208 or 906 and 908, more or fewer mirrors may be used to fold an optical path, as long as at least a portion of the optical path is folded at least once at an aperture of the system. Similarly, different numbers of mirrors or differently placed mirrors may be used to fold all or portions of the optical path more than once at the aperture. As used herein, "fold the optical path at the aperture" means at least one ray of the optical path is folded at the aperture.

Figure 17:
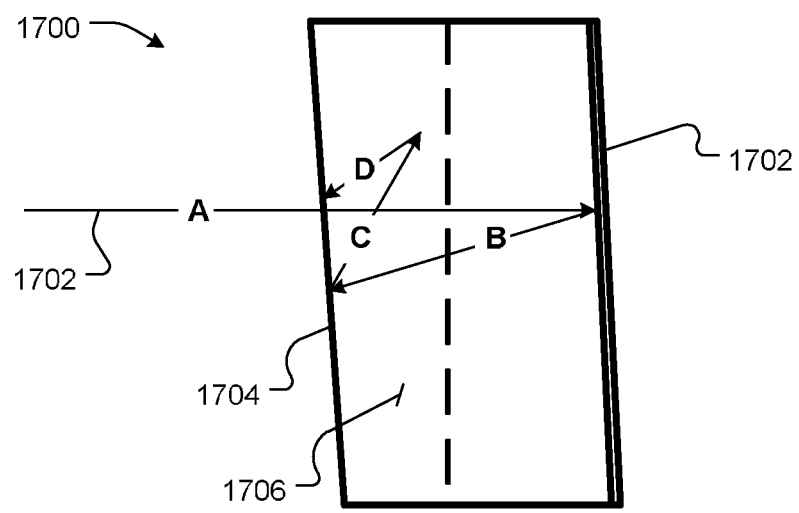
FIG. 17 is a front view of an optical block, similar to the view in FIG. 4 of the optical block of FIG. 1, except in FIG. 17 the optical block includes non-vertical surfaces and exhibits a non-coplanar optical path, according to yet another embodiment of the present invention.

The optical systems described thus far define optical paths in which all the rays (A, B, C, etc.) are co-planar. For example, in FIG. 8, the off-axis parabolic surface 204, the two flat surfaces 206 and 208 and the exit surface 202 are all vertically oriented, thus all the rays A, B, C, D and E are co-planar. However, optical systems according to other embodiments may include non-vertically oriented off-axis parabolic surfaces, non-vertical flat surfaces and/or non-vertical output surfaces which, collectively, may define optical paths in which all the rays are not necessarily co-planar, as exemplified schematically in FIG. 17. FIG. 17 is a front view schematic diagram of an optical block 1700, similar to the view in FIG. 4 of the optical block 100, except the optical block 1700 in FIG. 17 includes a non-vertical off-axis surface 1702 and non-vertical flat surfaces 1704 and 1706. Consequently, the optical path B, C and D are not co-planar.

Figure 19:
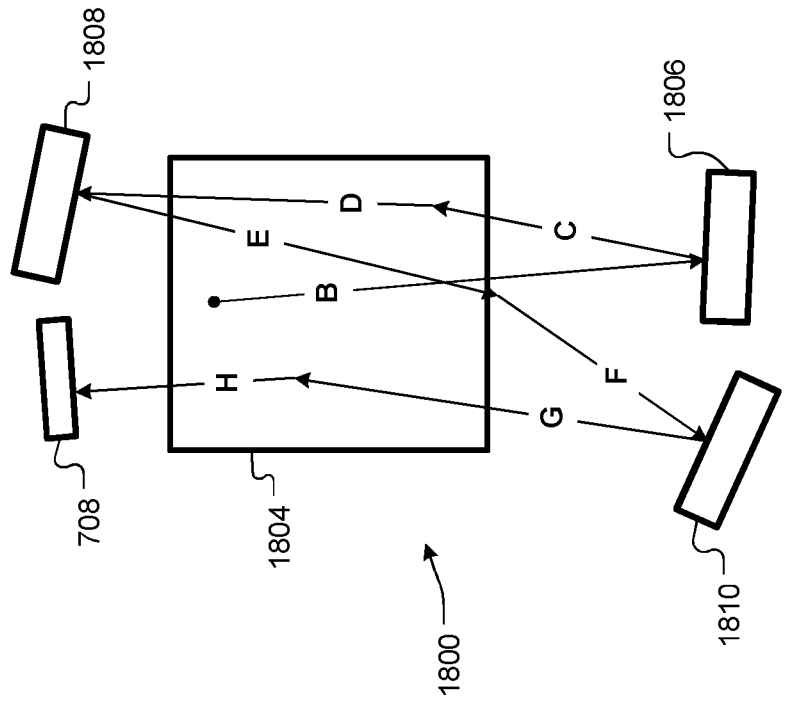
FIGS. 18 and 19 are respective top and back view schematic diagrams of an optical system that includes both a non-co-planar optical path and multiple folds of the optical path at its aperture, according to an embodiment of the present invention.
Figure 18:
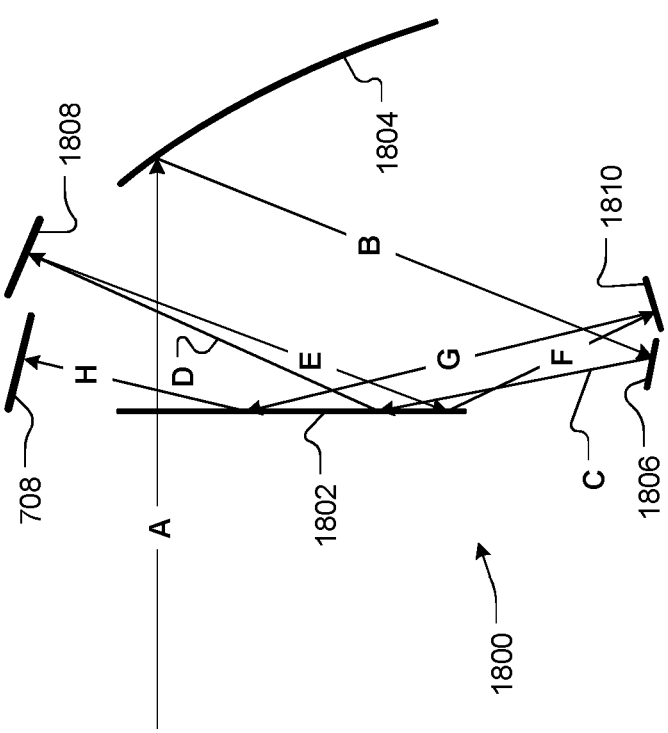

FIGS. 18 and 19 are respective top and back view schematic diagrams of an optical system 1800 that includes both multiple folds at its aperture 1802 and non-co-planar optical paths. Ray B, after being reflected by an off-axis parabolic mirror 1804, impinges on a first flat mirror 1806 and is there reflected as ray C toward the aperture 1802. Ray C is reflected by the aperture 1802, and then ray D impinges on a second flat mirror 1808. Ray E is also reflected by the aperture 1802, after which ray F impinges on a third flat mirror 1810. Reflected ray G is then reflected by the aperture 1802, after which ray H impinges on the sensor 708.

Principles discussed in this section, such as multiple folds at the aperture, various numbers and orientations of folding mirrors and non-co-planar optical paths, also apply to embodiments that include metamaterials in their apertures and/or in their mirrors.

Optional Wavelength Dispersive Element

Figure 20:
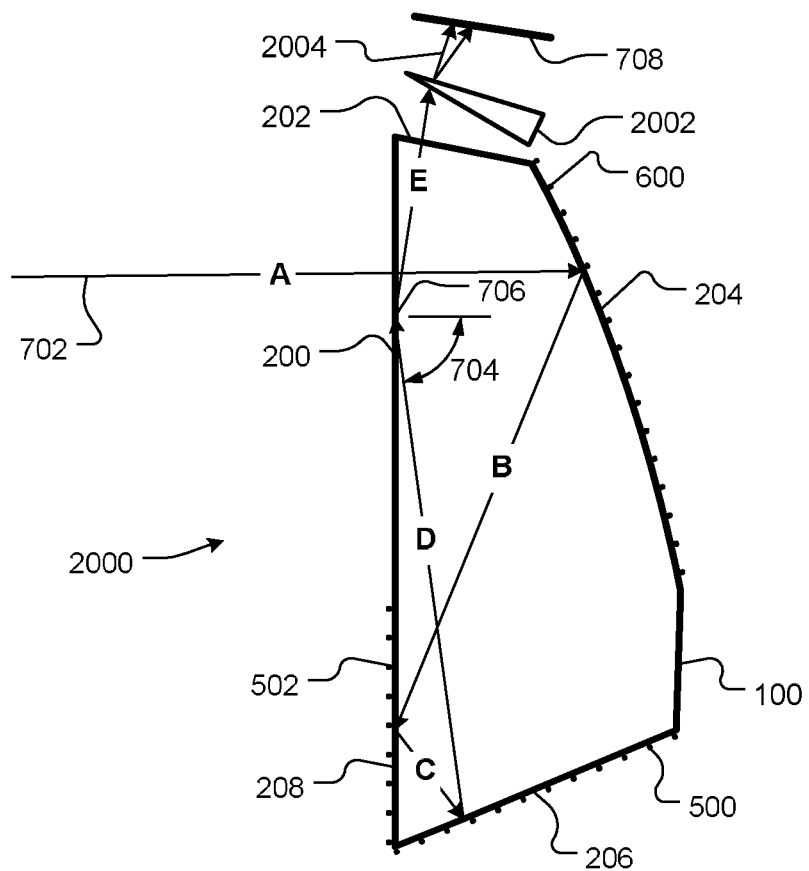
FIG. 20 is a top view schematic diagram of an optical block system that includes a wavelength-dispersive element, according to an embodiment of the present invention.

Optionally, any of the optical systems described herein may include a wavelength-dispersive element, such as a prism or a diffraction grating, along its optical path to implement a spectrometer, as exemplified schematically in FIG. 20. Here, optical system 2000 includes a prism 2002 disposed along the optical path, downstream of the output surface 202, to produce a wavelength-dispersed signal 2004. In other embodiments, the prism may be disposed at other locations along the optical path, such as upstream of the aperture 200. Similarly, a prism may be disposed along the optical path A, B, C, D and E of a discrete component optical system, such as the optical system 900 shown in FIG. 9.

Figure 21:
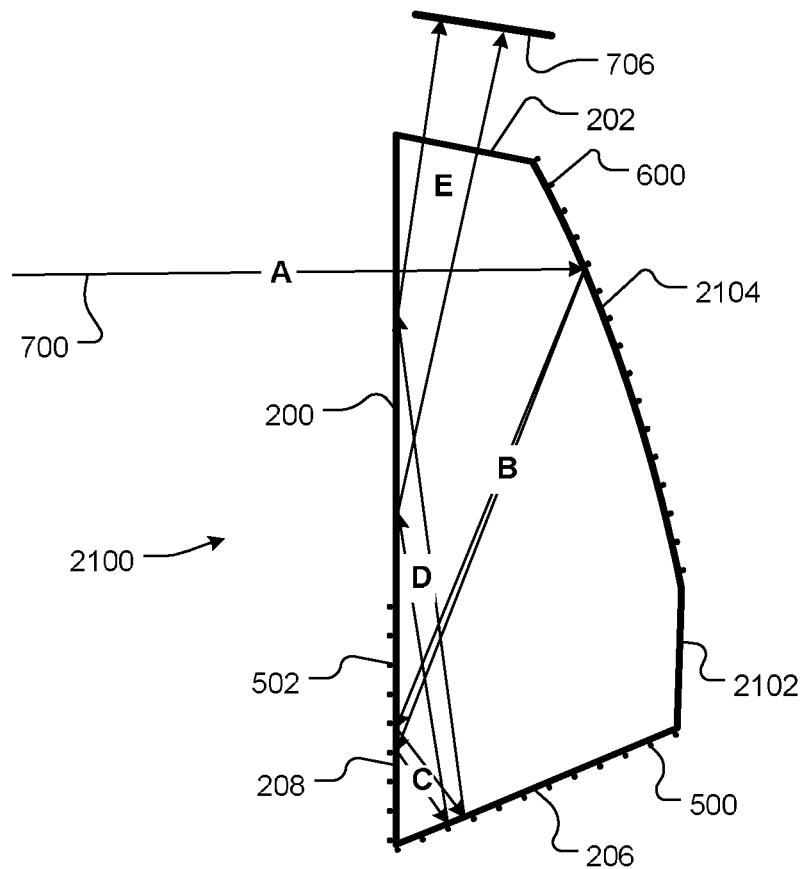
FIG. 21 is a top view schematic diagram of an optical block, similar to the optical block of FIGS. 1-7, except including a diffraction grating, showing an optical path extending through the optical block, according to an embodiment of the present invention.

FIG. 21 is a top view schematic diagram of another embodiment of a spectrometer 2100, according to the present invention. In this case, an optical block 2102 includes an off-axis parabolic surface 2104 ruled into a powered diffraction grating. Therefore, optical signal rays B, C, D and E are wavelength dispersed. Similarly, the discrete optical element system shown in FIG. 9 may be modified by replacing the off-axis parabolic mirror 904 with a powered diffraction grating (not shown).

In yet other embodiments (not shown), the optical bock 100 (FIG. 7) may be fabricated from a wavelength-dispersive material, such as a suitable flint glass.

Other Embodiments and Variations

Figure 22:
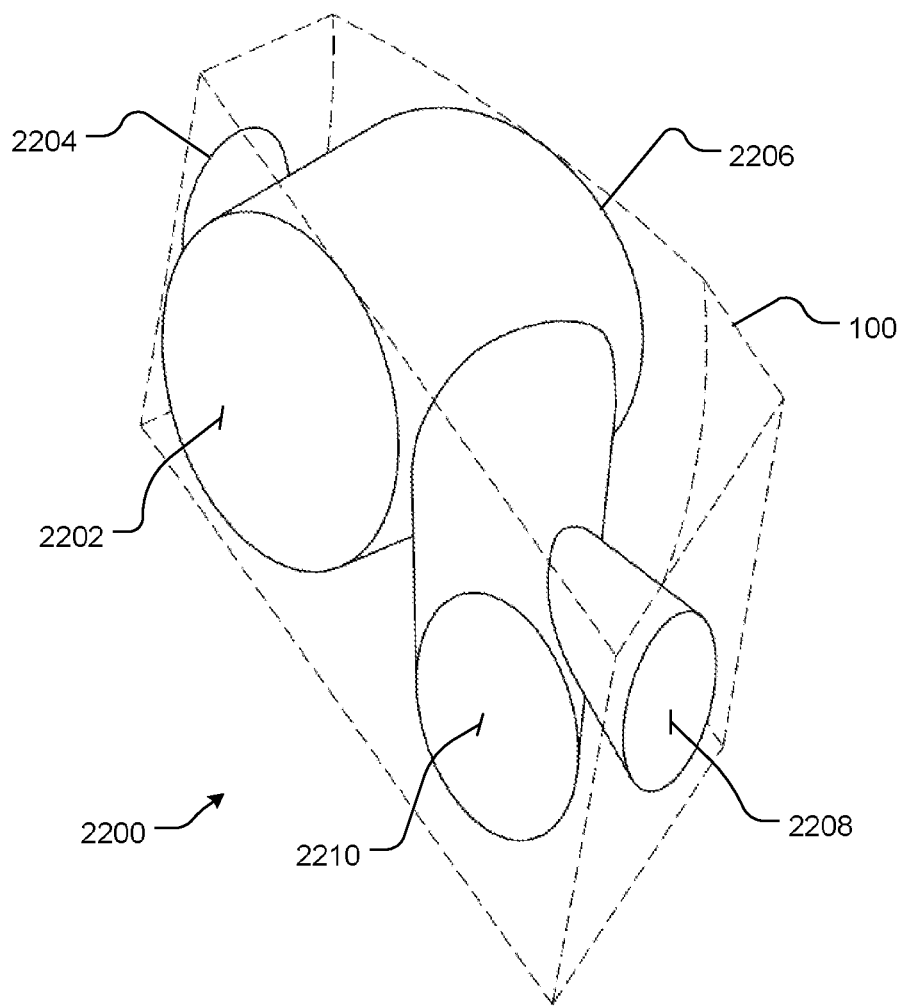
FIG. 22 is a perspective schematic diagram of an optical block, similar to the optical block of FIGS. 1-8, except with excess material removed, according to another embodiment of the present invention.

The optical block 100 described above, with respect to FIGS. 1-8, has straight vertical edges and generally rectangular faces, except for the off-axis parabolic surface 204. However, the various surfaces may be round, and excess material of the block, i.e., material not needed to transmit light, may be removed to reduce mass of the optical block, thereby creating a reduced optical block 2200, as exemplified in FIG. 22. For reference, a corresponding outline of optical block 100 of FIGS. 1-8 is shown in dashed line. As with the optical block 100 of FIGS. 1-8, the reduced optical block 2200 has an aperture 2202, a flat output surface 2204, an off-axis parabolic surface 2206 and two flat surfaces 2208 and 2210. These surfaces 2202-2210 correspond to the aperture 200, output surface 202, off-axis parabolic surface 204 and flat surfaces 206 and 208, respectively, of the optical block 100 of FIGS. 1-8.

The choice of materials and/or metamaterials suited for a specified application may be informed by the following non-exhaustive list of considerations: wavelength or range of wavelengths of optical signal(s) of interest; environment (temperature, pressure and/or gas or vacuum) in which the optical system is to be used, coefficient of thermal expansion of materials and/or metamaterials used, cost, mass and volume. While specific parameter values may be recited for disclosed embodiments, within the scope of the invention, the values of all of parameters may vary over wide ranges to suit different applications.

While the invention is described through the above-described exemplary embodiments, modifications to, and variations of, the illustrated embodiments may be made without departing from the inventive concepts disclosed herein. Furthermore, disclosed aspects, or portions of these aspects, may be combined in ways not listed above and/or not explicitly claimed. Thus, aspects disclosed with respect to a particular figure or group of figures may be combined with aspects disclosed with respect to another figure or group of figures. Accordingly, the invention should not be viewed as being limited to the disclosed embodiments.

CITATIONS

The entire contents of the following documents are hereby incorporated by reference herein, for all purposes:
[1] Brian Schwartz, et al., A New Path—Ultralow-index metamaterials present new possibilities for controlling light propagation, SPIE's oemagazine, January, 2005, pp. 30-32.
[2] Brian T. Schwartz, et al., Total external reflection from metamaterials with ultralow refractive index, J. Opt. Soc. Am. B, Vol. 20, No. 12, December, 2003, pp. 2448-2453.
[3] Brian T. Schwartz, et al., Waveguiding in air by total external reflection from ultralow index metamaterials, Applied Physics Letters, Vol. 85, No. 1, Jul. 5, 2004.

What is claimed is:

1. An optical system comprising:
an aperture configured to admit an optical signal along an optical path;
a powered optical element disposed along the optical path and configured to receive the optical signal along the optical path and to forward the optical signal along the optical path; and
a first mirror disposed along the optical path downstream of the powered optical element and configured to fold the optical path at the first mirror;
wherein the aperture, the powered optical element and the first mirror are configured to fold the optical path at the aperture, and the aperture is configured, at least at wavelengths within a predetermined range, to transmit the optical signal along the optical path through the aperture and then to externally reflect the optical signal from a surface of the aperture, so as to fold the optical path at the aperture.

2. An optical system according to claim 1, wherein at least one of: (a) the powered optical element and (b) the first mirror is coated with a metamaterial configured to reflect the optical signal.

3. An optical system according to claim 1, wherein at least one of: (a) the powered optical element and (b) the first mirror is patterned with sub-wavelength sized microstructures configured to reflect the optical signal.

4. An optical system according to claim 1, wherein the first mirror is configured to at least partially correct an optical aberration, of the optical signal, caused by the powered optical element.

5. An optical system according to claim 1, wherein the aperture, the powered optical element and the first mirror are configured to fold the optical path at the aperture at a Brewster angle of the optical signal.

6. An optical system according to claim 1, wherein the aperture, the powered optical element and the first mirror are configured, and the aperture comprises a material having an index of refraction, so as to totally externally reflect the optical signal at the aperture.

7. An optical system according to claim 1, wherein the aperture comprises a material having an index of refraction less than 1.

8. An optical system according to claim 1, wherein the powered optical element comprises an off-axis parabolic mirror.

9. An optical system according to claim 8, wherein the powered optical element further comprises a diffraction grating.

10. An optical system according to claim 1, wherein the powered optical element comprises a lens.

11. An optical system according to claim 1, further comprising a wavelength dispersive element disposed along the optical path.

12. An optical system according to claim 1, further comprising a second mirror disposed along the optical path downstream of the first mirror and configured to fold the optical path at the second mirror; wherein the aperture, the powered optical element, the first mirror and the second mirror are configured to fold the optical path at the aperture.

13. An optical system according to claim 1, wherein the aperture, the powered optical element and the first mirror are separate discrete optical components.

14. An optical system according to claim 1, further comprising a diffraction grating disposed along the optical path.

15. An optical system according to claim 1, wherein the powered optical element comprises a shaped mirror.

16. An optical system according to claim 1, further comprising a first reflector spaced apart from the aperture, along the optical path, such that the optical signal impinges on one surface of the first reflector after being admitted by the aperture and before being reflected by any other surface of the optical system, wherein the first reflector is configured to prevent substantially any light passing therethrough from an opposite surface of the first reflector.

17. An optical system according to claim 16, wherein the powered optical element comprises the first reflector.

18. An optical system according to claim 1, further comprising a first reflector spaced apart from the aperture, along the optical path, such that the optical signal impinges on one surface of the first reflector after being admitted by the aperture and before being reflected by any other surface of the optical system, wherein the first reflector is configured to prevent substantially any light entering the optical system via an opposite surface of the first reflector.

19. An optical system according to claim 1, further comprising a first reflector spaced apart from the aperture, along the optical path, such that the optical signal impinges on one surface of the first reflector after being admitted by the aperture and before being reflected by any other surface of the optical system, wherein the first reflector is configured to substantially reflect the optical signal.

20. An optical system according to claim 1, further comprising a first reflector spaced apart from the aperture, along the optical path, such that the optical signal impinges on one surface of the first reflector after being admitted by the aperture and before being reflected by any other surface of the optical system, wherein the first reflector is configured to redirect a broad bandwidth of the optical signal along the optical path.

21. An optical system according to claim 1, further comprising a first reflector spaced apart from the aperture, along the optical path, such that the optical signal impinges on one surface of the first reflector after being admitted by the aperture and before being reflected by any other surface of the optical system, wherein the first reflector is coated with a metamaterial configured to substantially reflect the optical signal.

22. An optical system according to claim 1, further comprising a first reflector spaced apart from the aperture, along the optical path, such that the optical signal impinges on one surface of the first reflector after being admitted by the aperture and before being reflected by any other surface of the optical system, wherein the first reflector is patterned with sub-wavelength sized microstructures configured to substantially reflect the optical signal.

23. An optical system according to claim 1, further comprising a first reflector spaced apart from the aperture, along the optical path, such that the optical signal impinges on one surface of the first reflector after being admitted by the aperture and before being reflected by any other surface of the optical system, wherein the first reflector is coated with a metamaterial configured to prevent substantially any light passing through the first reflector from an opposite surface of the first reflector.

24. An optical system according to claim 1, further comprising a first reflector spaced apart from the aperture, along the optical path, such that the optical signal impinges on one surface of the first reflector after being admitted by the aperture and before being reflected by any other surface of the optical system, wherein the first reflector is patterned with sub-wavelength sized microstructures configured to prevent substantially any light passing through the first reflector from an opposite surface of the first reflector.

* * * * *